(12) United States Patent
Dix et al.

(10) Patent No.: US 12,208,549 B2
(45) Date of Patent: Jan. 28, 2025

(54) POLYMERIC FOAM PROCESSING SYSTEMS AND METHODS

(71) Applicant: Trexel, Inc., Wilmington, MA (US)

(72) Inventors: Samuel Edward Dix, Newton, NH (US); Levi A. Kishbaugh, Groveland, MA (US); Samantha Whitney, Dunstable, MA (US)

(73) Assignee: Trexel, Inc., Wilmington, MA (US)

( * ) Notice: Subject to any disclaimer, the term of this patent is extended or adjusted under 35 U.S.C. 154(b) by 389 days.

(21) Appl. No.: 16/572,972

(22) Filed: Sep. 17, 2019

(65) Prior Publication Data

US 2020/0254658 A1    Aug. 13, 2020

Related U.S. Application Data

(60) Provisional application No. 62/766,620, filed on Sep. 17, 2018.

(51) Int. Cl.
*B29C 44/02* (2006.01)
*B29C 44/34* (2006.01)

(52) U.S. Cl.
CPC .......... *B29C 44/3446* (2013.01); *B29C 44/02* (2013.01)

(58) Field of Classification Search
CPC .............................. B29C 44/3446; B29C 44/02
See application file for complete search history.

(56) References Cited

U.S. PATENT DOCUMENTS

| 5,154,088 | A | 10/1992 | Lehnert et al. |
| 5,866,053 | A | 2/1999 | Park et al. |
| 6,051,174 | A | 4/2000 | Park et al. |
| 6,231,942 | B1 | 5/2001 | Blizard et al. |
| 6,322,347 | B1 | 11/2001 | Xu |
| 6,602,063 | B1 | 8/2003 | Cardona |
| 6,602,064 | B1 | 8/2003 | Chen et al. |
| 6,884,377 | B1 | 4/2005 | Burnham et al. |
| 7,318,713 | B2 * | 1/2008 | Xu ........................ B29C 48/575 425/208 |
| 7,429,420 | B2 | 9/2008 | Wiese et al. |
| 9,708,456 | B2 | 7/2017 | Choe et al. |
| 9,956,732 | B2 | 5/2018 | Murphy et al. |
| 2001/0033040 | A1 | 10/2001 | Cardona et al. |
| 2002/0091168 | A1 | 7/2002 | Kitayama et al. |
| 2002/0147244 | A1 | 10/2002 | Kishbaugh et al. |
| 2002/0147245 | A1 | 10/2002 | Kim et al. |
| 2004/0080065 | A1 | 4/2004 | Kim |
| 2004/0145074 | A1 | 7/2004 | Habibi-Naini et al. |

(Continued)

FOREIGN PATENT DOCUMENTS

EP    1 512 509 A2    3/2005
JP    2016-113570 A   6/2016

(Continued)

OTHER PUBLICATIONS

Partial Supplementary European Search Report for EP Application No. 19863065.9 dated May 17, 2022.

(Continued)

*Primary Examiner* — Alison L Hindenlang
*Assistant Examiner* — Debjani Roy
(74) *Attorney, Agent, or Firm* — Wolf, Greenfield & Sacks, P.C.

(57) ABSTRACT

Polymeric foam processing systems and methods.

18 Claims, 3 Drawing Sheets

(56) References Cited

U.S. PATENT DOCUMENTS

| | | |
|---|---|---|
| 2004/0170819 A1 | 9/2004 | Boyer |
| 2005/0087997 A1 | 4/2005 | Zander et al. |
| 2005/0143479 A1 | 6/2005 | Xu et al. |
| 2012/0181729 A1 | 7/2012 | Turng et al. |
| 2012/0196115 A1 | 8/2012 | Choe et al. |
| 2015/0038606 A1* | 2/2015 | Baghdadi ............ B29C 44/3446 521/137 |
| 2015/0038607 A1 | 2/2015 | Baghdadi |
| 2016/0039162 A1 | 2/2016 | Murphy et al. |
| 2017/0174821 A1 | 6/2017 | Combs et al. |

FOREIGN PATENT DOCUMENTS

| | | |
|---|---|---|
| JP | 2017-024333 A | 2/2017 |
| JP | 2017-094538 A | 6/2017 |
| WO | WO 98/31521 A2 | 7/1998 |
| WO | WO 2013/075994 A1 | 5/2013 |
| WO | WO 2018/025916 A1 | 2/2018 |

OTHER PUBLICATIONS

Extended European Search Report for EP Application No. 19863065.9 dated Aug. 19, 2022.
International Search Report and Written Opinion for PCT/US2019/051422 mailed Nov. 19, 2019.
International Preliminary Report on Patentability (Chapter 1) for International Application No. PCT/US2019/051422 dated Mar. 25, 2021.

* cited by examiner

POLYMERIC FOAM PROCESSING SYSTEMS AND METHODS

RELATED APPLICATIONS

This application claims priority to U.S. Provisional Application No. 62/766,620 filed Sep. 17, 2018, which is incorporated herein by reference in its entirety.

FIELD

The present invention relates generally to polymer foam processing and, more particularly, to polymeric foam processing systems and methods.

BACKGROUND

Polymeric foams include a plurality of voids, also called cells, in a polymer matrix. Polymeric foams are processed using a variety of techniques. For example, polymeric foams can be processed by injecting a physical blowing agent into the polymeric material within an extruder. For instance, many conventional systems inject blowing agent through a blowing agent port in the barrel of the extruder into a fluid stream of polymeric material within the extruder. The blowing agent may be mixed with the polymeric material to form a solution within the extruder. The solution may be, for example, injected into a mold to form an injection molded polymeric foam article.

Microcellular foams are a type of polymeric foam characterized by having small cell sizes and high cell densities. Microcellular foams may have a number of property and processing advantages. Certain processing steps may be required (or preferred), when forming microcellular foams. The steps include sufficiently mixing polymeric material and blowing agent sufficiently to form a homogeneous mixture (e.g., single-phase solution) within an extruder, maintaining a high pressure within the homogeneous mixture to prevent premature nucleation of the microcells and rapidly reducing the pressure to nucleate the microcells at a desired time.

Certain conventional injection molding systems are not capable of satisfying all of the aforementioned steps needed to produce microcellular polymeric foams. Typically, such systems are designed with the intention of operating under a set of conditions inconsistent with the production of microcellular polymeric foams. Other systems have been designed specifically to produce microcellular polymeric foams. Some such systems have involved expensive equipment modifications and/or have sacrificed other performance metrics (e.g., output).

Accordingly, there is a need for injection molding systems that may be used to produce microcellular polymeric materials without the need for expensive equipment modifications and/or other performance disadvantages.

SUMMARY

Polymeric foam processing systems and methods are described.

In one aspect, a system is provided. The system is designed to process polymeric foam material. The system comprises an extruder including a screw configured to rotate in a barrel to convey polymeric material downstream in a processing space within the barrel. The extruder is configured to maintain a back pressure of $P_b$ on the screw when the screw rotates to convey polymeric material. The screw is designed to include a mixing section and a downstream end. The system comprises a blowing agent source configured to introduce blowing agent into the polymeric material in the extruder through a blowing agent port formed in the barrel and at a blowing agent receiving section of the screw to form a mixture of blowing agent and polymeric material in the processing space. The blowing agent concentration in the mixture is C. The system comprises a mold connected to an outlet of the extruder. The screw is configured to periodically move in a downstream direction in the barrel to an injection position to inject a shot of polymeric material and blowing agent into the mold, the shot having a volume of Vs, wherein the screw is configured to retract upstream from the injection position while rotating. A mixing volume of Vm is defined as the volume of the mixture of blowing agent and polymeric material in the processing space between the blowing agent receiving section of the screw and a downstream end of the screw when the screw is in the injection position. An effective solubility ratio of the system is characterized by: Effective Solubility Ratio=$P_b/(C \times Vr)$, wherein $Vr=Vs/Vm$. The system is configured to have an effective solubility ratio of greater than 1500.

In one aspect, a method of processing polymeric foam material is provided. The method comprises providing an extruder including a screw mounted in a barrel. The screw is designed to include a mixing section and a downstream end of the screw. The method comprises rotating the screw to convey polymeric material downstream in a processing space within the barrel while maintaining a back pressure of Pb on the screw when the screw rotates to convey polymeric material. The method further comprises introducing blowing agent from a blowing agent source through a blowing agent port formed in the barrel at a blowing agent receiving section of the screw to form a mixture of blowing agent and polymeric material in the processing space. The blowing agent concentration in the mixture is C. The method further comprises moving the screw in a downstream direction in the barrel to an injection position to inject a shot of polymeric material and blowing agent into the mold. The shot has a volume of Vs. The method further comprises recovering a polymeric foam article from the mold. A mixing volume of Vm is defined as the volume of the mixture of blowing agent and polymeric material in the processing space between the blowing agent receiving location of the screw and the downstream end of the screw when the screw is in the injection position. The method operates at an effective solubility ratio characterized by: Effective Solubility Ratio=$P_b/(C \times Vr)$, wherein the effective solubility ratio is greater than 1500.

In another aspect, a system designed to process polymeric foam material is provided. The system comprises an extruder including a screw configured to rotate in a barrel to convey polymeric material downstream in a processing space within the barrel. The system further comprises a modular barrel extension constructed and arranged to attach to a downstream end of the barrel. The modular barrel extension includes a blowing agent port configured to connect to a blowing agent source to introduce blowing agent into the polymeric material in the modular barrel extension. The system further comprises a screw extension constructed and arranged to attach to a downstream end of the screw. The screw extension is configured to rotate within the barrel extension to convey polymeric material and blowing agent downstream in a processing space downstream of the blowing agent port within the barrel extension. The system further comprises a screw extension including a restriction element positioned upstream of the blowing agent port in the barrel when the screw rotates. The screw extension includes a blowing agent receiving section downstream of the restriction element and a mixing section downstream of the blowing agent receiving section. The restriction element is configured to prevent upstream flow of polymeric material and blowing agent during an injection portion of a molding cycle. The system further comprises a mold connected to an outlet of the modular barrel extension.

Other aspects and features will become apparent from the following detailed description of the invention when considered in conjunction with the accompanying drawings.

DETAILED DESCRIPTION

Polymeric foam processing systems and methods are described herein. For example, the systems can be used to produce injection molded polymeric foam articles. The systems may be configured to operate with an effective solubility ratio, as described further below, within a certain range to promote formation of high quality polymeric foam articles including microcellular polymeric foam articles. The effective solubility ratio may be calculated from certain equipment and processing parameters including the volume ratio and processing ratio which are described in more detail below. Advantageously, the systems may not require expensive equipment modifications and/or designs.

Figure 1:
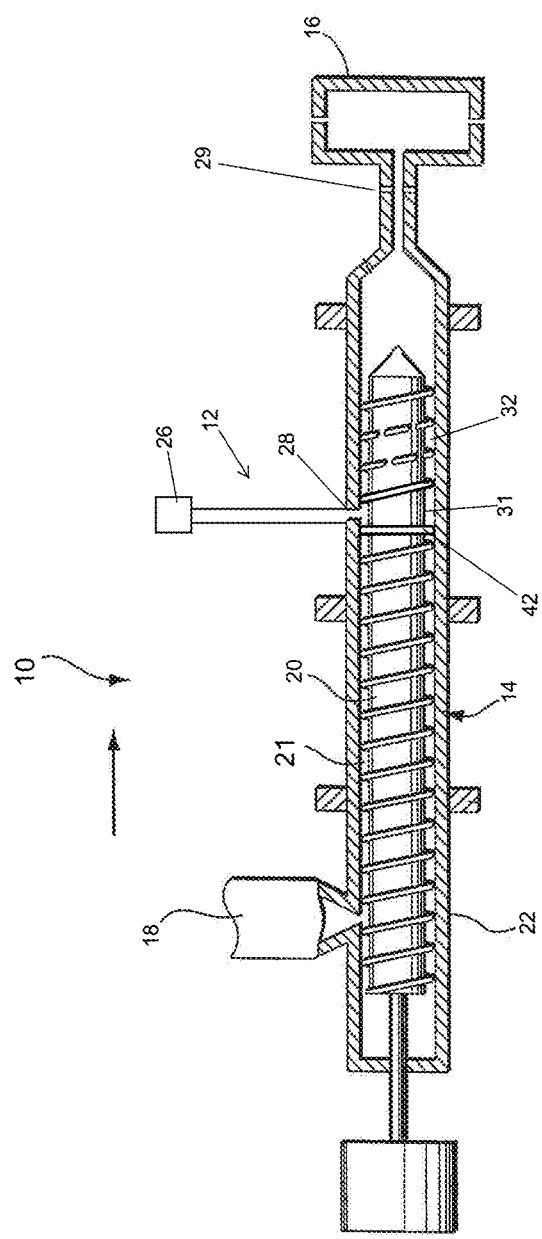
FIG. 1 schematically illustrates a polymer foam processing system according to an embodiment.

Referring to FIG. 1, a polymer foam processing system 10 is schematically shown. The system includes a blowing agent introduction system 12 used to deliver physical blowing agent (e.g., nitrogen and/or carbon dioxide). In this embodiment, the system is an injection molding system that includes an extruder 14 and a mold 16. A hopper 18 provides polymeric material (e.g., in the form of pellets) to the extruder. The extruder includes a screw 20 designed to rotate within a barrel 22 to plasticate polymeric material. Heat (e.g., provided by heaters on the extruder barrel) and shear forces (e.g., provided by the rotating screw) act to melt the polymeric material to form a fluid polymeric stream. The stream is conveyed in a downstream direction by the rotation of the screw.

In the illustrated embodiment, the blowing agent introduction system includes a physical blowing agent source 26 (e.g., nitrogen) that is connected to one or more port(s) 28 in the barrel of the extruder. The system is configured to control the flow of physical blowing agent from the source into the fluid polymeric stream in the extruder. The location on the screw at which blowing agent is introduced is referred to herein as a blowing agent receiving section 31. As described further below, the screw may include sections specifically designed to receive blowing agent and/or mix blowing agent (e.g., in a mixing section 32) downstream of the introduction location.

The polymeric material and blowing agent mixture is conveyed in a downstream direction in the extruder barrel by rotation of the screw. In some embodiments, the mixture is a single-phase solution with the physical blowing agent being dissolved in the polymeric material prior to injection into the mold.

A shot of the mixture (e.g., single-phase solution) may be accumulated downstream of the screw within the extruder causing the screw to retract in an upstream direction within the barrel. When suitable conditions have been reached (e.g., after a predetermined time period, at a predetermined screw position, etc.), the screw stops retracting and rotating to end a plastication period of the molding cycle. During the injection period of the molding cycle, the screw may be forced downstream within the barrel to an injection position to inject the mixture into a cavity of the mold while a valve 29 associated with the outlet of the extruder is opened. The mixture is subjected to a pressure drop during injection which nucleates a large number of cells and a polymer foam article is formed in the mold. The screw may begin to rotate once again to begin another molding cycle. The method is typically repeated to produce multiple polymeric foam articles.

It should be understood that the polymer foam processing system may include a number of conventional components not illustrated in the figure. Though the blowing agent introduction system is illustrated as being used in conjunction with an injection molding system, it should be understood that the blowing agent introduction system may be used in conjunction with other types of polymer processing systems.

Figure 2:
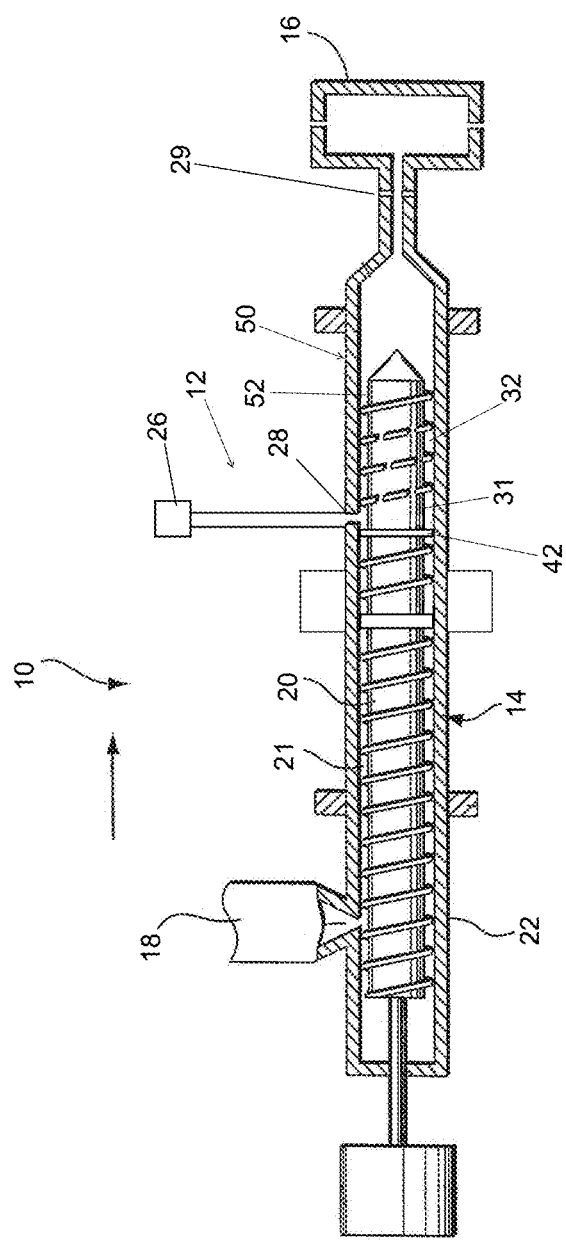
FIG. 2 schematically illustrates a polymer foam processing system including a modular barrel extension according to an embodiment.

Referring to FIG. 2, a polymer foam processing system 10A is schematically shown. Similar to the embodiment in FIG. 1, the system includes extruder 14 having screw 20 designed to rotate within barrel 22 to plasticate polymeric material. As described above, heat (e.g., provided by heaters on the extruder barrel) and shear forces (e.g., provided by the rotating screw) act to melt the polymeric material to form a fluid polymeric stream which is conveyed in a downstream direction by the rotation of the screw. In this embodiment, a modular barrel extension 50 is attached to a downstream end of the barrel and a screw extension 52 which is attached to a downstream end of the screw. The screw extension rotates within the barrel extension as the screw rotates within the barrel. The assembly has the effect of increasing the overall processing length (and length-to-diameter ratio) of the screw.

It should be understood that the modular barrel extension may be attached to a conventional barrel of an existing extruder. That is, an existing extruder used to process polymeric material may be modified to include a modular barrel extension and screw extension. Such modification may have the advantage of lowering equipment costs, for example, versus the system shown in FIG. 1, in some cases.

As shown, the modular barrel extension includes blowing agent port 28 that is connected to the physical blowing agent source 26 (e.g., nitrogen) of a blowing agent introduction system 10. The system is configured to control the flow of physical blowing agent from the source into the fluid polymeric stream in the extruder. As described further below, the screw extension may include sections specifically designed to receive blowing agent (i.e., blowing agent receiving section 31) and/or mix blowing agent (i.e., mixing section 32) downstream of the introduction location. In these embodiments, the other piece of the screw generally does not include such sections.

The polymeric material and blowing agent mixture is conveyed in a downstream direction in the modular barrel extension by rotation of the screw extension. In some embodiments, the mixture is a single-phase solution with the physical blowing agent being dissolved in the polymeric material prior to injection into the mold.

A shot of the mixture (e.g., single-phase solution) may be accumulated downstream of the screw extension within the modular barrel causing the screw (including screw extension) to retract in an upstream direction. When suitable conditions have been reached (e.g., after a predetermined time period, at a predetermined screw position, etc.), the screw (including screw extension) stops retracting and rotating to end a plastication period of the molding cycle. During the injection period of the molding cycle, the screw (including screw extension) may be forced downstream to an injection position to inject the mixture into a cavity of the mold while a valve 29 associated with the outlet of the modular barrel is opened. The mixture is subjected to a pressure drop during injection which nucleates a large number of cells and a polymer foam article is formed in the mold. The screw (including screw extension) may begin to rotate once again to begin another molding cycle. The method is typically repeated to produce multiple polymeric foam articles.

As described above, the systems may be configured to operate with a effective solubility ratio within a certain desired range. The effective solubility ratio may be calculated using the following formula:

Effective Solubility Ratio=$Pb/(C \times Vr)$

In the formula, $P_b$ is the specific back pressure, also sometimes referred to in the art as the plastic back pressure and to be distinguished from the hydraulic back pressure, (psi) maintained on the screw as it rotates to convey polymeric material (and blowing agent after introduction) during the plastication period of molding cycle.

In the formula, C is the concentration of blowing agent in the mixture of polymeric material and blowing agent (e.g., nitrogen) which may be expressed as the percentage weight of blowing agent based on total weight of polymeric material in the mixture.

In the formula, Vr is referred to as the volume ratio and is determined by the following formula: Vr=Vs/Vm. Vm (in$^3$) is defined as the volume of the mixture of blowing agent and polymeric material in the processing space between the blowing agent receiving location of the screw and the downstream end of the screw (including screw extension, if present) when the screw is in the injection position.

In the formula, Vs (in$^3$) is defined as the volume of the shot of polymeric material and blowing agent introduced into the mold.

The inventors recognized that the effective solubility ratio was an important parameter in determining the quality of the resulting polymeric foam molded article. For example, operating at an effective solubility ratio (e.g., using nitrogen as a blowing agent) of at least 1500 was important in producing high quality polymeric (e.g., polypropylene) foam (e.g., microcellular foam) articles that included small cell sizes. In some embodiments, operating at an effective solubility ratio (e.g., using nitrogen as a blowing agent) of at least 2000 was important in producing high quality polymeric (e.g., nylon) foam articles; and, in some embodiments, an effective solubility ratio (e.g., using nitrogen as a blowing agent) of at least 2300 was important. In some embodiments, the effective solubility ratio is less than 3000.

In certain embodiments, the volume ratio (Vr) may also be a useful parameter to assess the quality of resulting polymeric foam article. In some cases, it may be desirable to operate with certain desired volume ratios. For example, in some embodiments, it may be preferable for the volume ratio to be greater than 2.5; in some cases, greater than 1.5; and, in some cases, greater than 1.0.

The concentration (C) of blowing agent in the mixture may be less than 5 weight % based on the total weight of polymeric material in the mixture. In some embodiments, the concentration may be less than 2 weight %, and, in others, less than about 1% based on the total weight of polymeric material. In particular, when nitrogen is used as the blowing agent, the amount of nitrogen may be less than 0.5 weight percent or less than 0.25 weight percent based on the weight of the polymeric material. In some embodiments, the blowing agent is present in an amount greater than 0.01 weight percent based on the weight of the polymeric material.

As noted above, nitrogen may be used as the physical blowing agent in the systems and methods described herein. In other embodiments, carbon dioxide may be used. It should be understood that other physical blowing agent types (e.g., hydrocarbons, noble gases, etc.) may be used in some embodiments. The blowing agent may be supplied in any flowable physical state such as a gas, a liquid, or a supercritical fluid. In some embodiments, it may be preferable to use a blowing agent in a supercritical state (e.g., nitrogen).

The system may be operated with certain back pressure (Pb) ranges on the screw as it rotates to convey polymeric material (and blowing agent after introduction) during the plastication period of molding cycle. For example, the back pressure may be at least 1000 psi; in some embodiments, at least 2000 psi; and, in some embodiments, at least 3000. In some embodiments, the back pressure is less than 4000 psi.

The configuration of the screw including screw extension (if present) may be important in achieving sufficient mixing to promote formation of a single-phase solution within the barrel. For example, the screw may be designed to have blowing agent receiving section (e.g., wiping) and/or mixing sections of sufficient length. In embodiments which include a screw extension, the extension may include the blowing agent receiving section (e.g., wiping) and/or mixing sections of sufficient length.

The blowing agent receiving section is generally positioned beneath the blowing agent port(s) during processing so that this section receives the blowing agent introduced into the processing space. In some embodiments, the receiving section may be referred to as a wiping section that includes a screw flight (e.g., an unbroken screw flight) which passes beneath the blowing agent port (including orifices, if present) to enhance dispersion of blowing agent when introduced into the polymeric material. The wiping section, for example, may have a length of between about one-half and about three times the diameter of the screw.

The mixing section of the screw is positioned downstream of the blowing agent receiving section. In embodiments which include a screw extension, the extension may include the mixing section. The mixing section enhances the mixing of the blowing agent and polymeric material; the mixing could be distributive or dispersive or any combination of the two. The enhanced mixing may enable formation of a single-phase solution of polymeric material and blowing agent which is desirable for microcellular processing, as noted above. The mixing section may have a variety of suitable designs known in the art. For example, the mixing section may include broken screw flights. Certain known designs of mixing sections are referred to as Maddock, spiral Maddock, pineapple, pin, gear, and kneading mixers (and combinations thereof). The length of the mixing section may be between about 0 and 3 times the screw diameter.

In some embodiments, the combined length of the mixing section and blowing agent receiving section (e.g., wiping) is at least 3 times the screw diameter; and, in some embodiments; at least 4 times the screw diameter.

In certain embodiments, the screw is designed to have a restriction element 44 positioned upstream of the blowing agent receiving section (and upstream of the blowing agent port 42 when the screw is mounted within the barrel). In embodiments which include a screw extension, the extension may include the restriction element. The restriction element is configured to restricts (and, in some cases, substantially prevent) the upstream flow of polymeric material and blowing agent mixture in the processing space, while the shot is injected into the mold. The restriction element, thus, maintains the pressure of the mixture in the polymer processing space to prevent blowing agent from prematurely coming out of solution. For example, the restriction element may maintain the polymeric material downstream of the restriction element at a pressure of at least 1000 psi throughout the injection cycle; in other cases, at least about 2000 psi; or, at least about 3000 psi throughout the injection cycle.

In some cases, the restriction element is a valve which permits downstream flow of polymeric material therethrough in an open configuration and restricts upstream flow of polymeric material therethrough in a closed configuration. The valve, for example, may move from the closed configuration to the open configuration when the pressure of polymeric material downstream of the valve exceeds the pressure of polymeric material upstream of the valve. Suitable restriction element designs have been described in commonly-owned, U.S. Pat. No. 6,322,347, which is incorporated herein by reference.

In some embodiments, the screw does not need to include a tip valve that is present at the downstream end of the screw in certain conventional systems. This can be an advantage of the systems described herein over such conventional systems because eliminating the tip valve can simplify construction and operation. In some embodiments, the screw includes only a single valve (e.g., in the form of a restriction element).

As noted above, blowing agent is introduced into the extruder through one or more ports. In general, port(s) 42 are formed at a position in the barrel that enables formation of a homogenous mixture of polymeric material and blowing agent mixture within the polymer processing space prior to injection into the mold. As described above, port(s) may be positioned relative to specific sections of the screw, as described further below It should be understood that other port positions may also be suitable. The introduction of blowing agent through a plurality of ports located at different positions in the barrel, for example, may promote formation of a uniform mixture of polymeric material and blowing agent. When multiple ports are utilized, the ports can be arranged radially about the barrel or axially along the length of the barrel. In some embodiments, the blowing agent port. The blowing agent port may have a cross-sectional area of less than 80 mm$^2$, in certain embodiments.

In some cases, though not all cases, it may be desirable to introduce blowing agent into the polymeric material in the polymer processing space through a plurality of orifices associated with one or more of the blowing agent ports. Blowing agent introduction through a plurality of orifices, for example, may promote formation of a uniform mixture of polymeric material and blowing agent.

As described above, the system may include a shutoff nozzle valve associated with the outlet of the extruder. During the accumulation of a shot of polymeric material and blowing agent, the shut-off nozzle valve is in a closed configuration to maintain the pressure in the polymeric material/blowing agent mixture sufficiently high within the barrel. The high pressure ensures that blowing agent remains dissolved in a single-phase solution of polymeric material and blowing agent formed within the extruder. The opening of the injection valve permits flow of polymeric material into the mold and nucleation of the mixture upon introduction into the mold. One or more heating units be associated with the shutoff nozzle valve. It should be understood that a shut-off nozzle valve may not be present in certain systems.

As noted above, the blowing agent source may supply physical blowing agent (e.g., nitrogen) to the extruder. The blowing agent introduction system may include a metering device connected to an outlet of the source to monitor and control the flow rate of blowing agent supplied by the source. Metering device may be any of the type known in the art. In some embodiments, the metering device meters the mass flow rate of the blowing agent. In these embodiments, the mass flow rate of the blowing agent supplied by the source may be varied over a wide range as required by the particular process. For example, the blowing agent mass flow rate is generally between about 0.001 lbs/hr and 100 lbs/hr, in some cases between about 0.002 lbs/hr and 60 lbs./hr, and in some cases between about 0.02 lbs./hr and about 10 lbs./hr. It should be understood that, in some embodiments, the flow of blowing agent into the polymeric material may be discontinuous as a result of the discontinuous plastication of polymeric material in certain processes (e.g., injection mold processes).

The blowing agent introduction system also may include an injector valve positioned between the source and port. When the injector valve is in an open configuration, the flow of blowing agent from the source to the polymeric material in the extruder is stopped. When the injector valve is in an open configuration, blowing agent from the source is permitted to flow through the valve and into the polymeric material in the extruder. Therefore, the injector valve may be used to selectively control the introduction of blowing agent into the polymeric material in the retrofitted system.

In some embodiments, the polymer processing system includes a control system that facilitates operation of the system. The control system may receive input signals from and send output signals to one or more components of the system. The control system may also receive manual input signals in response to entries by an operator. In particular, control system 25 may be used to synchronize the operation of the injection molding system and blowing agent introduction.

As described above, the systems and methods may be used to form polymeric foam articles. In some embodiments, the systems and methods may be used to form microcellular polymeric foams. Suitable microcellular polymeric foams have been described, for example, in International Publication No. WO 98/31521 (Pierick et. al.), which is incorporated herein by reference. Microcellular foams have small cell sizes and high cell densities. As used herein, the term "cell density" is defined as the number of cells per cubic centimeter of original, unfoamed polymeric material. As used herein, the term "average cell size" is the numerical average of the size of the cells formed in an article. The average cell size can be determined, for example, by scanning electron microscopy (SEM) analysis of a representative area of the article.

In some embodiments, the microcellular foams have an average cell size of less than 100 microns; and, in other embodiments, an average cell size of less than 50 microns. In some of these microcellular embodiments, the cell size may be uniform, though a minority amount of cells may have a considerably larger or smaller cell size. In some cases, different regions of the article may have cells of different size. For example, edge regions of the article may generally have a smaller cell size than interior regions of the article. Furthermore, edge regions may even have no cells while the interior region does.

The polymeric foam articles, including microcellular foam articles, produced using the systems and methods described herein may be produced over a wide range of void fractions. Polymeric foams may be used that have a void fraction of between about 1% and about 99%. In some embodiments, higher density foams are used having a void fraction of less than 50%, in other cases a void fraction of less than 30%, and in some cases a void fraction of between about 5% and about 30%. The particular void fraction will depend upon the application.

The systems and methods may generally be used to process any suitable type of polymeric material. Suitable materials include thermoplastic polymers which may be amorphous, semicrystalline, or crystalline materials. Typical examples of polymeric materials include styrenic polymers (e.g., polystyrene, ABS), polyolefins (e.g., polyethylene and polypropylene), fluoropolymers, polyamides, polyimides, polyesters, polycarbonate, polyphenylene ether (PPE), thermoplastic elastomers, vinyl halides (e.g., PVC), acrylic (e.g., PMMA), acetal, other high temperature plastics (e.g., PEEK, PEKK, PES, PPS, PEI, PPA) and the like. The polymeric material may also include any number of other additives known in the art such as reinforcing agents, lubricants, plasticizers, colorants, fillers, stabilizers and the like. Optionally, the articles may include a nucleating agent, such as talc or calcium carbonate. In many embodiments, the articles are free of a nucleating agent. The articles are generally free of residual chemical blowing agents or reaction byproducts of chemical blowing agents. The articles are also generally free of non-atmospheric blowing agents, for example, when the supercritical fluid additive is an atmospheric gas (e.g., nitrogen, carbon dioxide).

Example

The following example illustrates the importance of the systems and methods operating within a certain effective solubility ratio range.

Figure 3:
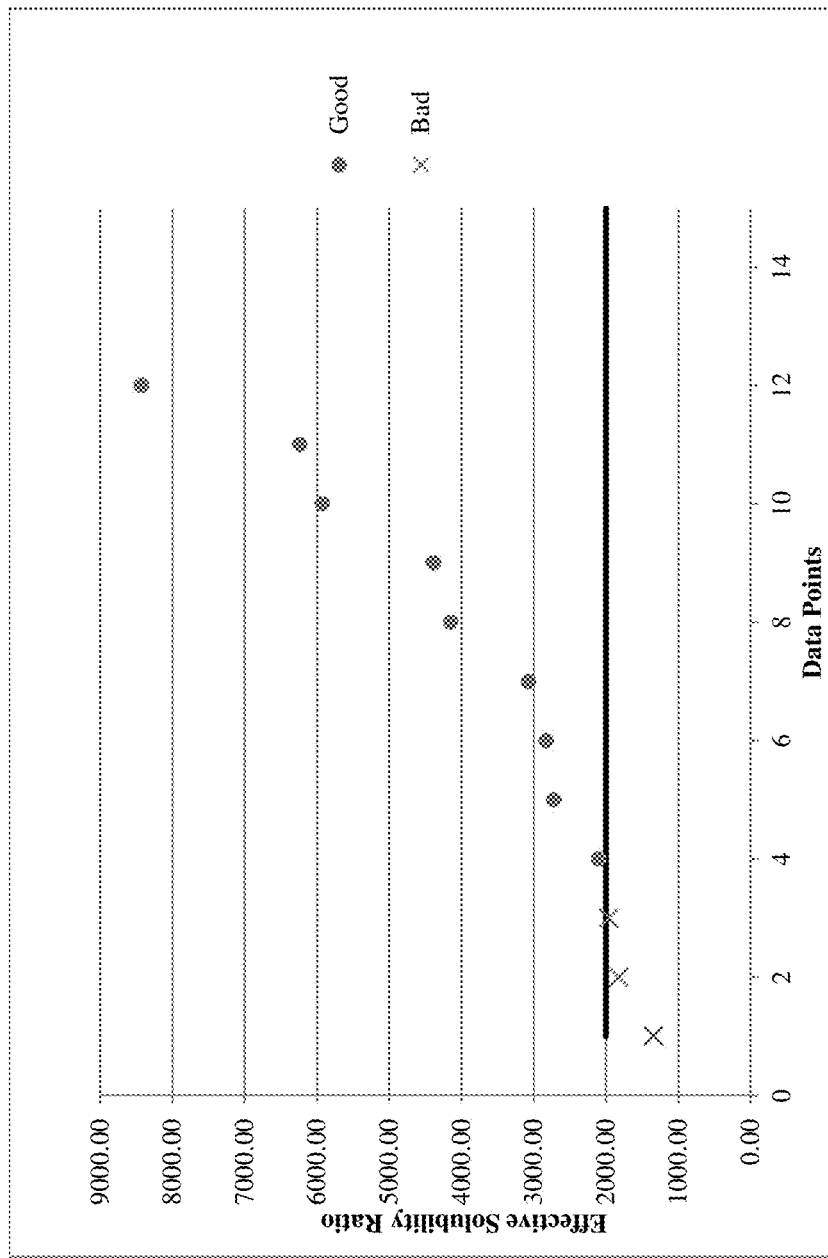
FIG. 3 is a graph showing the effective solubility ratio for a number of samples as described in Example 1.

A system similar to the one shown in FIG. 1 was used in this Example. The system was operated under a variety of different conditions and configurations to process glass-filled nylon polymeric material. A series of different molded polymeric foam articles were produced and examined for quality (e.g., cell size). FIG. 3 shows the effective solubility ratio for the different samples. As shown, when the effective solubility ratio was greater than 2000 then the samples were of high quality whereas the sample quality was lower when the effective solubility ratio was less than 2000.

Those skilled in the art would readily appreciate that all parameters listed herein are meant to be exemplary and that the actual parameters would depend upon the specific application for which the methods and articles of the invention are used. It is, therefore, to be understood that the foregoing embodiments are presented by way of example only and that, within the scope of the appended claims and equivalence thereto, the invention may be practiced otherwise than as specifically described. Furthermore, it should be understood that the systems described to herein may be newly manufactured systems or retrofitted systems.

What is claimed is:

1. A method of processing polymeric foam material comprising:
    providing an extruder including a screw mounted in a barrel, the screw designed to include a mixing section and a downstream end of the screw;
    rotating the screw to convey polymeric material downstream in a processing space within the barrel while maintaining a back pressure of Pb on the screw when the screw rotates to convey polymeric material;
    introducing blowing agent from a blowing agent source through a blowing agent port formed in the barrel at a blowing agent receiving section of the screw to form a mixture of blowing agent and polymeric material in the processing space, wherein the blowing agent concentration in the mixture is C;
    moving the screw in a downstream direction in the barrel to an injection position to inject a shot of polymeric material and blowing agent into the mold, the shot having a volume of Vs; and
    recovering a polymeric foam article from the mold,
    wherein a mixing volume of Vm is defined as the volume of the mixture of blowing agent and polymeric material in the processing space between the blowing agent receiving location of the screw and the downstream end of the screw when the screw is in the injection position; and
    wherein the method operates at an effective solubility ratio characterized by:

$$\text{Effective Solubility Ratio} = Pb/(C \times Vr)$$

wherein Vr=Vs/Vm,
wherein the effective solubility ratio is greater than 1500.

2. The method of claim 1, further comprising forming a single-phase solution of polymeric material and blowing agent in the processing space and injecting the single-phase solution into the mold.

3. The method of claim 1, wherein the blowing agent is nitrogen.

4. The method of claim 1, comprising maintaining a back pressure $P_b$ of at least 2000 psi.

5. The method of claim 1, wherein Vr is at least 2.5.

6. The method of claim 1, wherein the effective solubility ratio is at least 2000.

7. The method of claim 1, wherein the effective solubility ratio is at least 2300.

8. The method of claim 1, wherein the screw includes a restriction element positioned upstream of the blowing agent port.

9. The method of claim 1, wherein the blowing agent receiving section of the screw is comprised of a wiping section including an unbroken screw flight.

10. The method of claim 1, wherein the screw comprises a mixing section downstream of the blowing agent receiving location.

11. The method of claim 1, wherein the mixing section has an L:D ratio of between 0 and 3.

12. The method of claim 1, wherein the downstream end of the screw does not include a valve.

13. The method of claim 1, wherein the polymeric foam article has an average cell size of less than 100 microns.

14. The method of claim 1, wherein the extruder includes a single valve to limit upstream flow of polymeric material and blowing agent.

15. The method of claim 1, wherein the barrel comprises a modular barrel extension attached to a downstream end of a barrel section.

16. The method of claim 1, wherein the screw comprises a screw extension attached to a downstream end of a screw section.

17. The method of claim 1, wherein a combined length of a mixing section of the screw and the blowing agent receiving section of the screw is at least 3 times a diameter of the screw.

18. The method of claim 15, wherein the blowing agent port is formed in the modular barrel extension.

\* \* \* \* \*